United States Patent
Kajimura et al.

(10) Patent No.: US 10,326,938 B2
(45) Date of Patent: Jun. 18, 2019

(54) IMAGE STABILIZATION CONTROL APPARATUS, OPTICAL APPARATUS AND STORAGE MEDIA STORING IMAGE STABILIZATION CONTROL PROGRAM

(71) Applicant: CANON KABUSHIKI KAISHA, Tokyo (JP)

(72) Inventors: Fumihiro Kajimura, Kawasaki (JP); Koichi Washisu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 73 days.

(21) Appl. No.: 15/602,630

(22) Filed: May 23, 2017

(65) Prior Publication Data

US 2017/0347032 A1 Nov. 30, 2017

(30) Foreign Application Priority Data

May 27, 2016 (JP) ................. 2016-106319

(51) Int. Cl.
*G06K 9/03* (2006.01)
*G06K 9/48* (2006.01)
*H04N 5/232* (2006.01)
*H04N 5/235* (2006.01)

(52) U.S. Cl.
CPC .......... *H04N 5/23287* (2013.01); *G06K 9/03* (2013.01); *G06K 9/481* (2013.01); *H04N 5/2352* (2013.01); *H04N 5/23245* (2013.01); *H04N 5/23254* (2013.01); *H04N 5/23258* (2013.01)

(58) Field of Classification Search
CPC .......... H04N 5/23287; H04N 5/23245; H04N 5/23258; H04N 5/2352; H04N 5/23254; G06K 9/03; G06K 9/481
See application file for complete search history.

(56) References Cited

U.S. PATENT DOCUMENTS

| | | | |
|---|---|---|---|
| 2009/0027544 A1* | 1/2009 | Grewal | H04N 5/23248 348/352 |
| 2010/0033583 A1* | 2/2010 | Tomita | H04N 5/23248 348/208.5 |
| 2011/0317024 A1* | 12/2011 | Miyasako | H04N 5/23254 348/208.11 |

(Continued)

FOREIGN PATENT DOCUMENTS

JP H05-122590 A 5/1993

*Primary Examiner* — Timothy J Henn
(74) *Attorney, Agent, or Firm* — Carter, DeLuca & Farrell LLP

(57) ABSTRACT

The image stabilization control apparatus that performs, using a shake detection signal acquired through a shake detector configured to detect a shake and a motion vector detection signal indicating a motion vector detected in a video signal produced through an image sensor, image stabilization control for reducing image blur due to the shake. The apparatus includes a predictor that produces, using the motion vector detection signal, a predicted error signal that indicates a predicted value of an error signal included in the shake detection signal, a signal producer that subtracts the predicted error signal from the shake detection signal to produce a first image stabilization signal, and a controller that performs the image stabilization control using the first image stabilization signal.

21 Claims, 8 Drawing Sheets

(56) References Cited

U.S. PATENT DOCUMENTS

| | | | |
|---|---|---|---|
| 2012/0033091 A1* | 2/2012 | Miyasako | H04N 5/23254 |
| | | | 348/208.1 |
| 2014/0111658 A1* | 4/2014 | Watanabe | H04N 5/23267 |
| | | | 348/208.1 |
| 2014/0184834 A1* | 7/2014 | Miyasako | H04N 5/23254 |
| | | | 348/208.1 |
| 2016/0316146 A1* | 10/2016 | Kajimura | H04N 5/23287 |
| 2017/0013198 A1* | 1/2017 | Wada | G06T 5/20 |
| 2017/0041547 A1* | 2/2017 | Takeuchi | H04N 5/23287 |
| 2017/0236552 A1 | 8/2017 | Kimura et al. | |

* cited by examiner

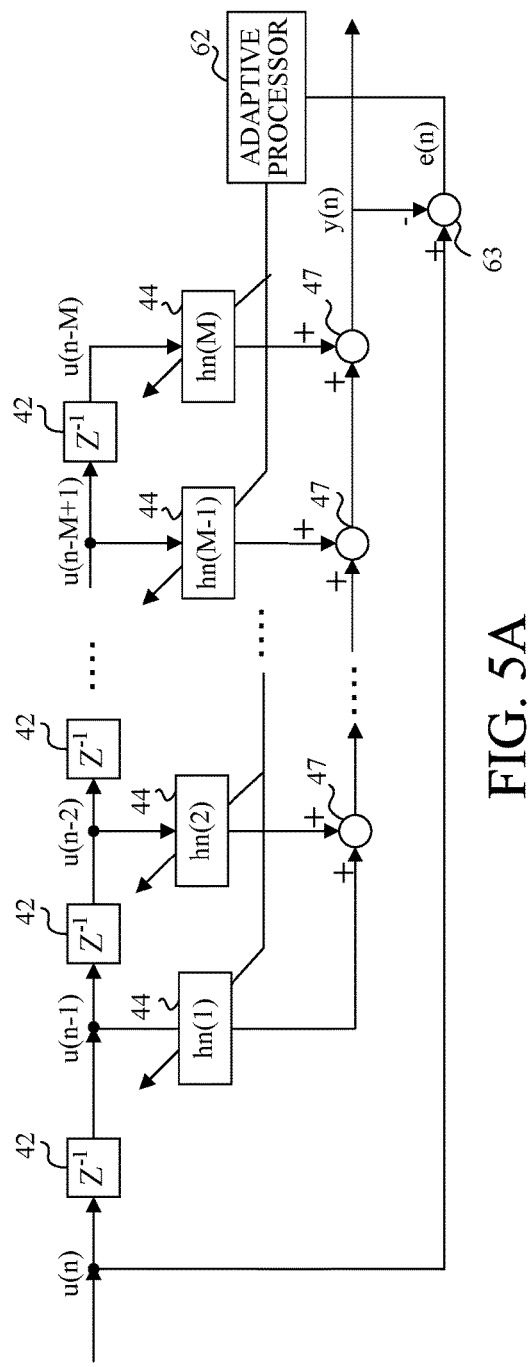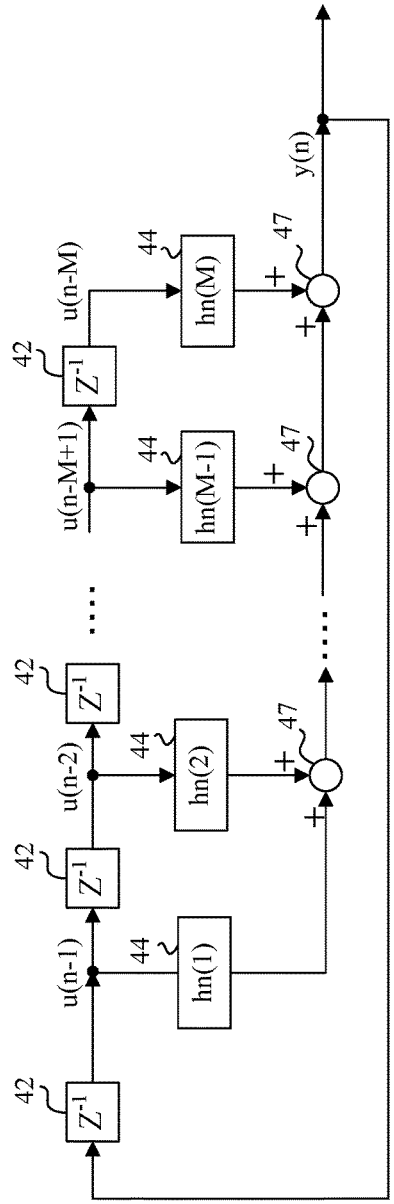
FIG. 5A
FIG. 5B

US 10,326,938 B2

IMAGE STABILIZATION CONTROL APPARATUS, OPTICAL APPARATUS AND STORAGE MEDIA STORING IMAGE STABILIZATION CONTROL PROGRAM

BACKGROUND OF THE INVENTION

Field of the Invention

The present invention relates to an image stabilization control apparatus for reducing image blur in optical apparatuses such as digital cameras and interchangeable lenses.

Description of the Related Art

Image stabilization techniques for correcting (reducing) image blur due to a camera shake caused by user's hand jiggling or the like when a digital camera performs still image capturing include optical image stabilization that shifts a lens or an image sensor (such as a CMOS sensor) relative to an image capturing optical axis. The camera shake is detected by using a shake detector such as an angular velocity sensor (gyro sensor) or by calculating a motion vector between frame images included in a captured motion image as disclosed in Japanese Patent Laid-Open No. 05-122590.

However, using the shake detector may cause superposition of a low-frequency noise (error component) called a drift component on a sensor output corresponding to the original camera shake and thereby decrease camera shake detection accuracy, which results in an insufficient image stabilization control. On the other hand, using the motion vector enables accurately detecting the camera shake. However, the motion vector is not detectable during an exposure time period of the image sensor for capturing a still image, so that the image stabilization control using the motion vector cannot be performed during that exposure time period.

SUMMARY OF THE INVENTION

The present invention provides an image stabilization apparatus capable of performing a good image stabilization control using an output from a shake detector during still image capturing where a motion vector is not acquirable.

The present invention provides as an aspect thereof an image stabilization control apparatus configured to perform, using a shake detection signal acquired through a shake detector configured to detect a shake and a motion vector detection signal indicating a motion vector detected in a video signal produced through an image sensor, image stabilization control for reducing image blur due to the shake. The apparatus includes a predictor configured to produce, using the motion vector detection signal, a predicted error signal that indicates a predicted value of an error signal included in the shake detection signal, a signal producer configured to subtract the predicted error signal from the shake detection signal to produce a first image stabilization signal, and a controller configured to perform the image stabilization control using the first image stabilization signal.

The present invention provides as another aspect thereof an optical apparatus including the above image stabilization control apparatus.

The present invention provides as yet another aspect thereof a non-transitory computer-readable storage medium for storing a computer program to cause a computer to execute, using a shake detection signal acquired through a shake detector configured to detect a shake and a motion vector detection signal indicating a motion vector detected in a video signal produced through an image sensor, image stabilization control for reducing image blur due to the shake. The program causes the computer to produce, using the motion vector detection signal, a predicted error signal that indicates a predicted value of an error signal included in the shake detection signal, subtract the predicted error signal from the shake detection signal to produce a first image stabilization signal, and perform the image stabilization control using the first image stabilization signal.

Further features of the present invention will become apparent from the following description of exemplary embodiments with reference to the attached drawings.

BRIEF DESCRIPTION OF THE DRAWINGS

FIG. 5A and 5B are block diagrams illustrating prediction processes performed by a predictor using an adaptive algorithm in Embodiment 2 of the present invention.

DESCRIPTION OF THE EMBODIMENTS

Exemplary embodiments of the present invention will hereinafter be described with reference to the accompanying drawings.

[Embodiment 1]

Figure 2:
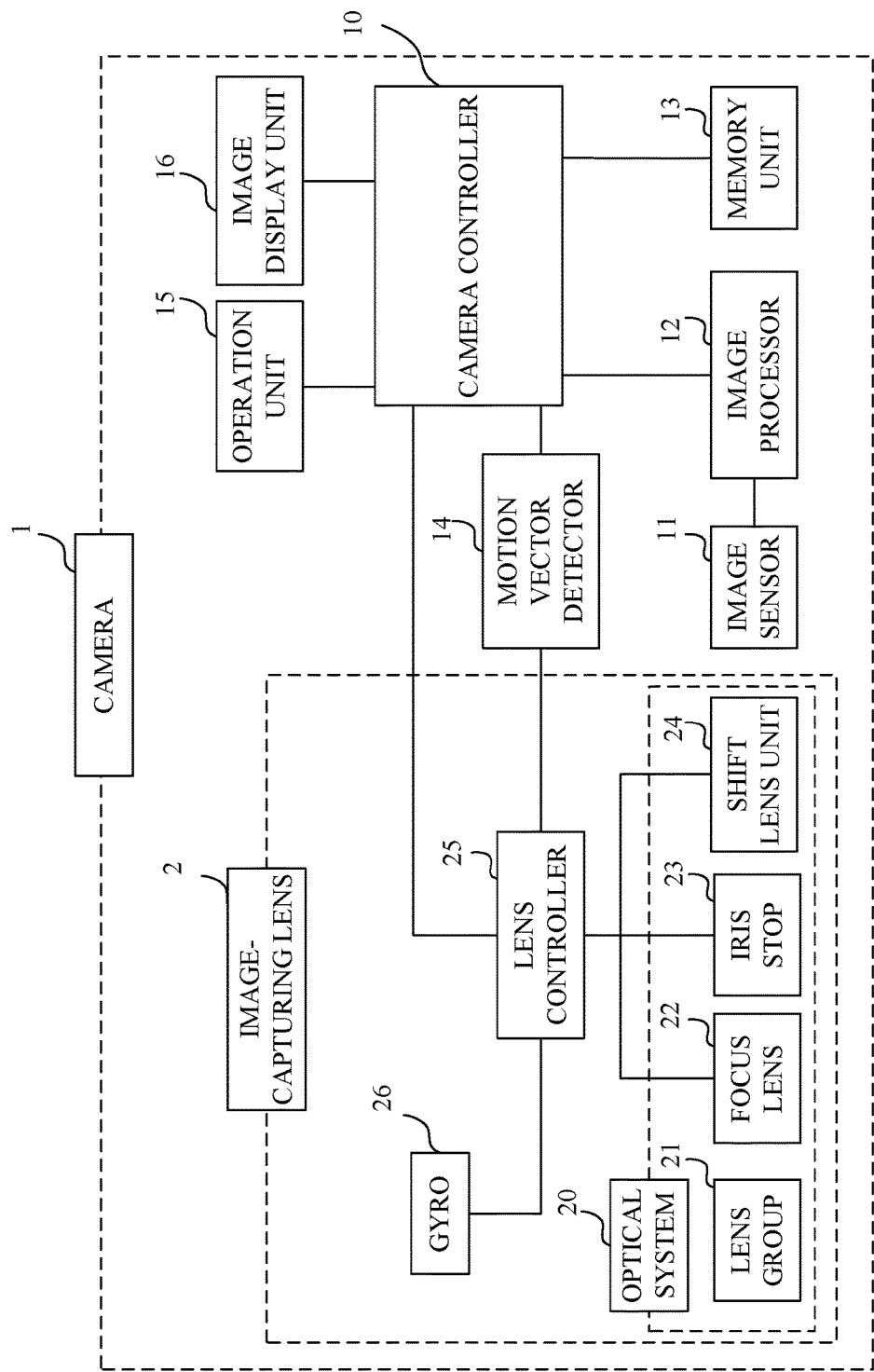
FIG. 2 is a block diagram illustrating a configuration of an image capturing apparatus including the image stabilization apparatus of Embodiment 1.

FIG. 2 illustrates a configuration of a digital camera 1 as an image capturing system including an image stabilization apparatus in a first embodiment (Embodiment 1) of the present invention. The camera 1 is constituted by an image-capturing lens 2 as an interchangeable lens, and a camera body as an image-capturing apparatus (or an optical apparatus) to which the image-capturing lens 2 is detachably attachable.

The camera body includes an image sensor 11 configured to photoelectrically convert an optical image (object image) formed by an image-capturing optical system 20 in the image-capturing lens 2, and an image processor 12 configured to produce a video (motion image) signal and a still image signal by using an image-capturing signal output from the image sensor 11. The camera body further includes a memory unit 13, a motion vector detector 14 configured to detect a motion vector from the video signal, an operation unit 15 configured to detect user's operations, an image display unit 16 configured to display images corresponding to the image signals, and a camera controller 10 configured to control the entire camera 1 including the image-capturing lens 2.

The motion vector detector 14 detects, between two consecutive frame images including the video signal, the motion vector that indicates a distance (motion amount) between mutually corresponding points in the two frame images and a direction of that distance, and outputs a motion vector detection signal that indicates the detected motion vector.

The image-capturing optical system 20 in the image-capturing lens 2 includes a lens group 21 constituted by a magnification-varying lens and other lenses, and a focus lens 22 movable to perform focusing, and an iris stop 23 that control an amount of light.

The image-capturing optical system 20 further includes a shift lens unit 24 that moves (shifts) a shift lens as an image stabilization element relative to an optical axis of the image-capturing optical system 20 in directions orthogonal to the optical axis to correct (reduce) image blur due to camera shake described later.

The shift lens unit 24 illustrated in FIG. 2 includes the shift lens, a shift actuator that drives the shift lens in the directions orthogonal to the optical axis, and a driver that drives the shift actuator.

The image-capturing lens 22 further includes a gyro sensor 26 as a shake detector configured to detect a camera shake that is a shake of the camera 1 due to user's hand jiggling, and a lens controller 25 configured to control drives of the focus lens 22, the iris stop 23 and the shift lens unit 24. The gyro sensor 26 outputs an angular velocity detection signal indicating an angular velocity of the camera shake.

The lens controller 25 controls the drive of the focus lens 22 (that is, AF) and the drive of the iris stop 23 (that is, AE) while communicating with the camera controller 10. The lens controller 25 includes an image stabilization controller configured to perform, using the motion vector detection signal from the motion vector detector 14 and the angular velocity detection signal from the gyro sensor 26, image stabilization control for controlling the drive (shift) of the shift lens (24), that is, drive of the shift actuator. This image stabilization controller corresponds to the image stabilization control apparatus.

The image-capturing signal (analog signal) from the image sensor 11 having photoelectrically converted the optical image formed by the image-capturing optical system 20 is converted by an A/D converter (not illustrated) in the image processor 12 into a digital signal. The image processor 12 performs, in response to commands from the camera controller 10, various image processes such as a white balance process, a gamma correction process and a pixel interpolation process to produce the image signal (video and still image signals). The image signal produced by the image processor 12 is recorded to a recording medium such as a semiconductor memory in the memory unit 13

The camera controller 10 is constituted by a computer including a CPU, an internal memory and others. The camera controller 10 outputs, when performing an image capturing operation, timing signals and commands to the above-described portions in the camera body and to the lens controller 25 in the image-capturing lens 2.

The camera controller 10 further controls an image capturing preparation operation (including AF and AE) when a first release signal SW1 as an image-capturing preparation signal produced in response to a user's half-press operation of a release switch included in the operation unit 15 is input. The camera controller 10 yet further controls a still image-capturing operation (including production and recording of a still image) when a second release signal SW2 as a still image-capturing instruction signal produced in response to a user's full-press operation of the release switch is input.

Next, with reference to FIG. 3, description will be made of the image stabilization control in still image capturing. In graph of FIG. 3, a horizontal axis indicates time, and a vertical axis indicates camera shake amount. A bold solid line 31 indicates the motion vector detection signal from the motion vector detector 14. The motion vector detection signal in this graph is corrected so as to have signal values corresponding to actual camera shake amounts regardless of a focal length of the image-capturing optical system 20 (that is, a size of the object image on the image sensor 11) and others. A thin solid line indicates a shake detection signal produced by integration of the angular velocity detection signal from the gyro sensor 26. The shake detection signal (hereinafter referred to as "a gyro shake detection signal") in this graph is produced so as to correspond to the same camera shake amount as that indicated by the motion vector detection signal. A dashed-dotted line 33 indicates an error component corresponding to a drift (noise) component generated in the gyro sensor 26. The error component (hereinafter referred to as "an error signal") is included in the gyro shake detection signal 32. That is, the gyro shake detection signal 32 is a signal in which the error signal 33 is superposed on an original shake detection signal corresponding to the actual camera shake amount.

A broken line 34 indicates a predicted error signal calculated by a prediction process described later. This predicted error signal 34 is used together with the gyro shake detection signal 32 in the image stabilization control during an exposure of the image sensor 11 for still image capturing (the exposure is hereinafter referred to as "a still image exposure").

Figure 3:
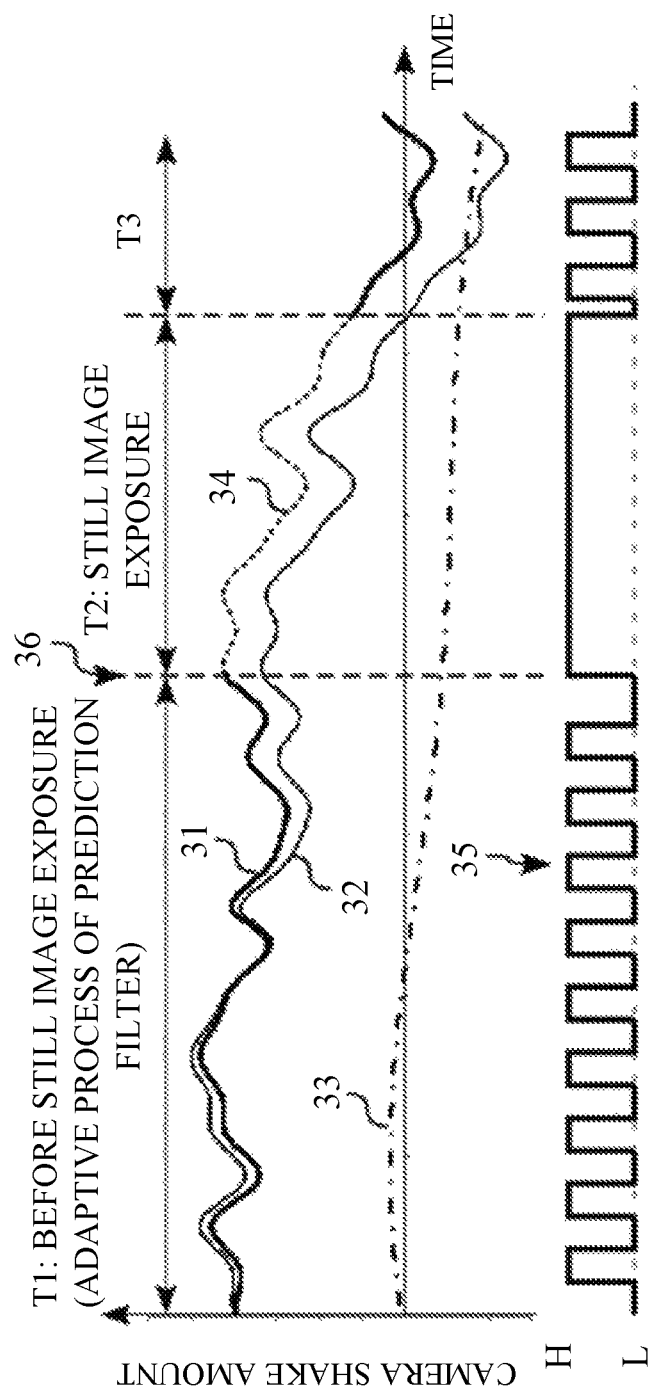
FIG. 3 illustrates a gyro shake detection signal, a motion vector detection signal, and an error signal in Embodiment 1.

A time chart 35 illustrated in a lower part of FIG. 3 indicates exposure times of the image sensor 11; H indicates the exposure time, and L indicates a non-exposure time. A first time period T1 is a time period before the still image exposure and in which short time exposures of the image sensor 11 for producing the above-mentioned frame images are repeated at a fixed cycle. Between two temporally adjacent frame images among the consecutively produced frame images, the motion vectors are sequentially detected by the motion vector detector 14. A prediction filter used for producing the predicted error signal 34 is sequentially produced (updated) by using the motion vector detection signal 31 and the gyro shake detection signal 32. The prediction filter will be described later.

The cycle of the short time exposures (frame rate of the video signal) in the first time period T1 is set to, for example, 120 fps (frames per second) or 240 fps.

In the first time period T1, the image capturing preparation operation including AF and AE is performed in response to the above-described first release signal SW1.

In a second time period T2 started from a time 36 in response to the above-described second release signal SW2, the still image exposure of the image sensor 11 is performed. In the second time period T2, the motion vector cannot be detected since one exposure is continuously performed.

A third time period T3 is a time period after completion of the still image exposure and in which, as in the first time period T1, short time exposures of the image sensor 11 are cyclically repeated.

In FIG. 3, a magnitude of the motion vector indicated by the motion vector detection signal 31, which is calculated from the video image produced by image capturing, approximately corresponds to the actual camera shake amount. On the other hand, the gyro shake detection signal 32, which includes the error signal 33 as described above, has divergence from the motion vector detection signal 31.

Therefore in this embodiment, the image stabilization controller in the lens controller 25 takes difference between the motion vector detection signal 31 and the gyro shake detection signal 32 in the first time period T1 before the still image exposure to calculate the error signal 33 included in the gyro shake detection signal 32. Then, the image stabilization controller predicts, using the calculated error signal 33, an error signal in the second time period T2 during the still image exposure (still image capturing), that is, produces the prediction filter for producing (updating) the predicted error signal 34. Since the magnitude of the motion vector approximately corresponds to the actual camera shake amount as described above, a signal acquired by subtracting the predicted error signal 34 from the gyro shake detection signal 32 can be regarded as indicating the actual camera shake amount.

In response to production of the second release signal SW2 at the time 36, the image stabilization controller preforms, using the prediction filter, the prediction process for calculating the predicted error signal 34 in the second time period T2 where the still image exposure is performed. In the prediction process, the image stabilization controller subtracts the predicted error signal 34 from the gyro shake detection signal 32 to calculate a shake correction signal (first image stabilization signal), and perform, using the shake correction signal, the image stabilization control for driving (shifting) the shift lens in the shift lens unit 24.

As just described, this embodiment calculates the error component (predicted error signal) included in the gyro shake detection signal acquired in the second time period T2 during the still image exposure as the difference between the motion vector detection signal and the gyro shake detection signal acquired in the first time period T1 before the still image exposure. This embodiment thereby acquires, in the second time period T2 during the still image exposure during which the motion vector is not acquirable, the shake correction signal in which an influence of the error component of the gyro shake detection signal is reduced, which enables performing a good image stabilization control with high accuracy.

Figure 1:
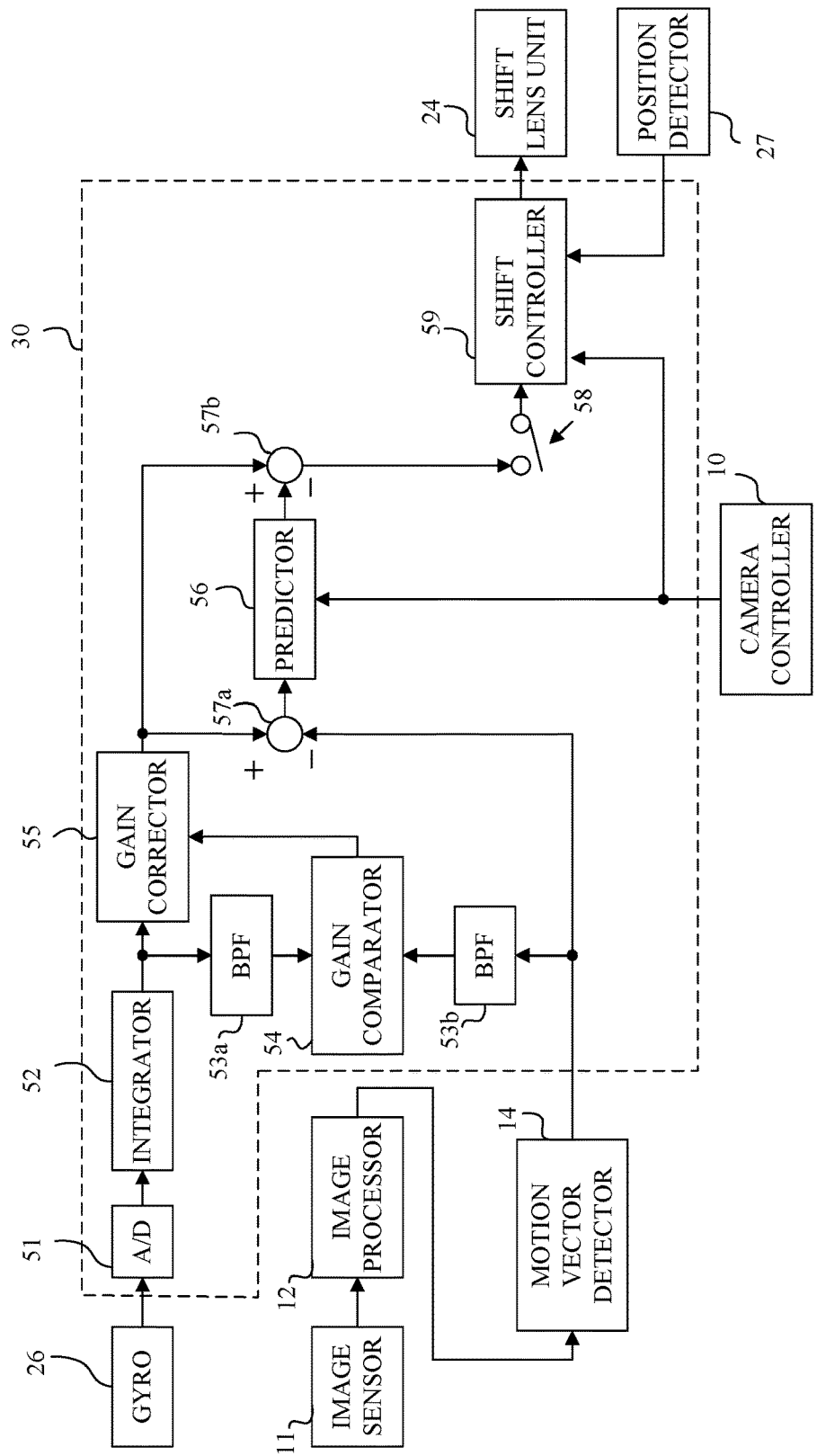
FIG. 1 is a block diagram illustrating a configuration of an image stabilization apparatus of Embodiment 1 of the present invention.

Next, with reference to FIG. 1, description will be made of a configuration and operations of the image stabilization controller 30 in the lens controller 25. In FIG. 1, constituent element common to those in FIG. 2 are denoted by the same reference numerals.

The image stabilization controller 30 surrounded by a broken line in FIG. 1 includes an analog-to-digital (A/D) converter 51, an integrator 52, band-pass filters (BPFs) 53a and 53b, a gain comparator 54, a gain corrector 55, a predictor 56, subtractors 57a and 57b, a switch 58, and a shift controller 59. The A/D converter 51 quantizes the angular velocity detection signal as an analog signal from the gyro sensor 26. A sampling frequency of the A/D converter 51 is set equal to the frame rate of the video signal used in the motion vector detector 14 (that is, equal to a sampling frequency of the image sensor 11). The integrator 52 integrates the angular velocity detection signal as a digital signal from the A/D converter 51 to produce the gyro shake detection signal as an angular displacement signal.

The BPFs 53a and 53b respectively extract a predetermined frequency component of the gyro shake detection signal from the integrator 52 and that of the motion vector detection signal from the motion vector detector 14. The gain comparator 54 compares a gain (magnitude) of the gyro shake detection signal having passed through the BPF 53a with that of the motion vector detection signal having passed through the BPF 53b. The gain corrector (gain adjuster) 55 corrects (controls) a gain of the gyro shake detection signal from the integrator 52 depending on a gain comparison result from the gain comparator 54. A reason for performing this correction is as follows.

The gyro shake detection signal indicates an angular velocity, and on the other hand, the motion vector detection signal indicates a motion of the object image on the image sensor 11. Therefore, even when the shake of the camera 1 is the same, the camera shake amount indicated by the gyro shake detection signal and that indicated by the motion vector detection signal are mutually different depending on the focal length of the image-capturing optical system 20 and a distance to an object to be captured (that is, an object distance). Thus, the gain comparator 54 compares the gyro shake detection signal and the motion vector detection signal in each of which a high frequency shake component that is little included in user's hand jiggling and an extremely low frequency signal component including a large amount of the drift component are cut by the BPFs 53a and 53b. Then, the gain corrector 55 corrects, depending on the gain comparison result, the gain of the gyro shake detection signal so as to make the corrected gain approximately equal to that of the motion vector detection signal.

The subtractor 57a subtracts, from the gain-corrected gyro shake detection signal from the gain corrector 55, the motion vector detection signal from the motion vector detector 14 to produce the error signal included in the gain-corrected gyro shake detection signal. The subtractor 57a sends the produced error signal to the predictor 56. The predictor 56 sequentially updates the prediction filter before the still image exposure. Specifically, the predictor 56 performs an adaptive process (adaptive operation) for sequentially updating filter coefficients of the prediction filter. Then, the predictor 56 performs, during the still image exposure, the prediction process for calculating the predicted error signal using the prediction filter.

The subtractor 57b subtracts the predicted error signal output from the predictor 56 from the gyro shake detection signal output from the gain corrector 55, and sends the shake correction signal (first image stabilization signal) as a result of the subtraction to the switch 58. The switch 58 is set off before the still image exposure as illustrated in FIG. 1, and is set on during the still image exposure to send the shake correction signal from the subtractor 57b to the shift controller 59. Execution and non-execution of the prediction process by the predictor 56 and on and off of the switch 58 are switched in response to commands from the camera controller 10 illustrated in FIG. 2.

The shift controller 59 drives (shifts) the shift lens in the shift lens unit 24 to a target shift position (that is, by a target shift drive amount) corresponding to the shake correction signal input through the switch 58. A shift position of the shift lens (24) is detected by a position detector 27. The shift position detected by the position detector (hereinafter referred to as "a detected shift position") is feedback to the shift controller 59. The shift controller 59 performs feedback control of the drive of the shift lens (24) such that the detected shift position becomes identical to the target shift position.

As described above, this embodiment regards, before the still image exposure, the difference between the motion vector detection signal and the gyro shake detection signal as the error signal included in the gyro shake detection signal, and updates, using the error signal, the prediction filter used by the predictor 56. Then, this embodiment subtracts, during the still image exposure, the predicted error signal produced by the predictor 56 using the predicted filter from the gyro shake detection signal to produce the shake correction signal in which the influence of the error signal is reduced. This embodiment thereby enables performing a good image stabilization control with high accuracy during the still image exposure.

Figure 4:
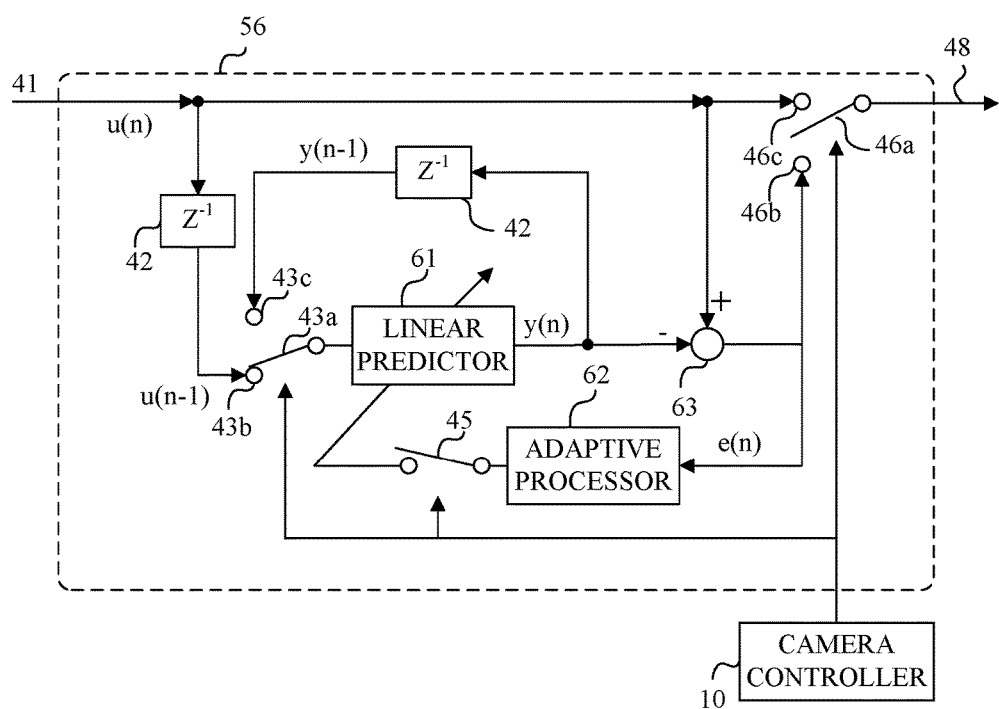
FIG. 4 is a block diagram illustrating a configuration of a predictor in Embodiment 1.

Next, with reference to FIG. 4, description will be made of a configuration and operations of the predictor 56. As illustrated in FIG. 4, the predictor includes a linear predictor 61 as the prediction filter, an adaptive processor 62, a subtractor 63, two unit delayers 42, a predictor input selecting switch 43a having contacts 43b and 43c, and an adaptive process switch 45, an output selecting switch 46a having contacts 46b and 46c, an input terminal 41, and an output terminal 48. The predictor input selecting switch 43a, the output selecting switch 46a and the adaptive process switch 45 are switched in response to commands from the camera controller 10. The error signal from the subtractor 57a illustrated in FIG. 1 is input to the input terminal 41, and the predicted error signal from the predictor 56 is output from the output terminal 48. Furthermore, u(n) represents the error signal (hereinafter also referred to as "an observed value") input from the subtractor 57a to the input terminal 41, and y(n) represents the predicted error signal (hereinafter also referred to as "a predicted value") from the linear predictor 61. In addition, e(n) represents an error generated in a linear prediction process performed by the linear predictor 61. This error e(n) is an error of the linear prediction process itself, which is different from the error such as the drift component generated in the gyro sensor 26, and is a difference value between the observed value u(n) and the predicted value y(n).

In the following description, this error e(n) is referred to as "a prediction process error". Each of u(n), y(n) and e(n) indicates an n-th sampling value.

First, description will be made of an operation performed by the predictor 56 before the still image exposure. Before the still image exposure, the predictor input selecting switch 43a is set so as to be connected to the contact 43b, the adaptive process switch 45 is set on, and the output selecting switch 46a is set so as to be connected to the contact 46c.

In this state, an output from the predictor input selecting switch 43a is u(n−1) that is unit-delayed from the observed value u(n) from the input terminal 41 by one of the unit delayers 42, and this u(n−1) is input to the linear predictor 61. The linear predictor 61 outputs the predicted value y(n) depending on the input u(n−1). That is, the linear predictor 61 produces a current predicted value y(n) depending on the observed value u(n−1) at one-unit previous sampling time from an n-th (current) sampling time. In this embodiment, a process to acquire the current predicted value from the observed value at one or more-unit previous sampling time corresponds to the prediction process. Detailed description of the linear predictor 61 will be made later.

The subtractor 63 calculates the prediction process error e(n) (=u(n)−y(n)) that the difference between the current observed value u(n) and the predicted value y(n). The adaptive processor 62 updates, using this prediction process error e(n) and a proper adaptive algorithm, the filter coefficients of the linear predictor (prediction filter) 61. In this embodiment, such an operation performed by the adaptive processor 62 for properly updating the linear predictor (prediction filter) 61 corresponds to the adaptive process. The operation of the adaptive processor 62 will be described later. The observed value u(n) is output to the output terminal 48 through the output selecting switch 46a.

As described above, in the state where the motion vector detection signal is acquirable from the motion vector detector 14 before the still image exposure, the predictor 56 directly outputs the error signal input to the input terminal 41 to the output terminal 48. On the other hand, the predictor 56 causes the adaptive processor 62 to perform the adaptive process for the linear predictor 61.

Next, description will be made of an operation of the predictor 56 in a state where the motion vector detection signal is not acquirable because it is during the still image exposure, that is, a state where the observed value u(n) as the error signal from the subtractor 57a is not acquirable. During the still image exposure, the predictor input selecting switch 43a is set so as to be connected to the contact 43c, the adaptive process switch 45 is set off, and the output selecting switch 46a is set so as to be connected to the contact 46b.

In this state, the output from the predictor input selecting switch 43a is one-unit previous predicted value y(n−1) from the other unit delayer 42, and this y(n−1) is input to the linear predictor 61. The linear predictor 61 outputs the current predicted value y(n) depending on the input one-unit previous predicted value y(n−1). The adaptive process switch 45 is set off, so that the operations of the adaptive processor 62 and the subtractor 63 are stopped. The predicted value y(n) is output to the output terminal 48 through the output selecting switch 46a.

As just described, during the still image exposure, the predictor 56 outputs the predicted value y(n) produced by the linear predictor 61 to the output terminal 48 and stops the operation of the adaptive processor 62.

In this embodiment, it is necessary that the lens controller 25 recognize beforehand whether or not it is during the image stabilization exposure. Therefore, the camera controller 10 sends, in response to input of the second release signal SW2 from the operation unit 15, a signal (notice) indicating that it is during the still image exposure to the lens controller 25.

Next, with reference to FIGS. 5A and 5B, detailed description will be made of configurations and operations of the linear predictor 61 and the adaptive processor 62. FIG. 5A illustrates operations of the linear predictor 61 and the adaptive processor 62 before the still image exposure, and FIG. 5B illustrates operations thereof during the still image exposure. FIGS. 5A and 5B illustrate only the operations relating to the linear predictor 61, and omit ones not relating to it such as the switches 43a and 46a. In FIGS. 5A and 5B, the constituent elements common to those illustrated in FIG. 4 are denoted by the same reference numerals as those in FIG. 4. FIGS. 5A and 5B illustrate filter coefficients 44, and adders 47.

As illustrated in FIG. 5A, the linear predictor 61 is constituted by a transversal filter. However, the linear predictor 61 may be constituted by other filters using proper adaptive algorithms, such as a lattice filter.

First, description will be made of the adaptive process. When the adaptive process as illustrated in FIG. 5A is performed, as understood from FIG. 5A, a current predicted value y(n) is acquired using following expression (1).

$$y(n) = \sum_{i=1}^{M} h_n(i)u(n-i) \quad (1)$$

In expression (1), M represents a filter order and is properly set depending on a sampling frequency of a signal to be subjected to the prediction process or the adaptive process and depending on a time at which the prediction process is performed. Furthermore, $h_n$ represents a filter coefficient.

Among various proposed adaptive algorithms used for the adaptive process, this embodiment uses an LMS (Least Mean Square) algorithm. The LMS algorithm is derived from a gradient method and updates the filter coefficient $h_n$ using following expression (2) where an index n added to h indicates that h is an n-th sampled filter coefficient, and µ represents a positive coefficient called a step-size parameter.

$$h_{n+1}(i)=h_n(i)+\mu e(n)u(i)(i=1,2,\ldots,M) \quad (2)$$

The LMS algorithm uses a steepest descent method, and thus the filter coefficient $h_n$ approaches from its initial value to a value corresponding to a minimum error. When the prediction process error e(n) is sufficiently small, that is, when the predicted value y(n) is approximated to the observed value u(n), an updating amount by the adaptive process is small.

Next, description will be made of the prediction process. When the prediction process illustrated in FIG. 5B is performed, the predicted value y(n) is used instead of the observed value u(n). In FIG. 5B, as an example, y(n−1) is used instead of u(u−1). On the other hand, the observed value is used as an input value in the previous prediction, so that FIG. 5B illustrates a case where a proper observed value as the input value in one prediction is not acquired.

If the above-described adaptive process makes the prediction process error e(n) sufficiently small, u(n−1) is almost equal to y(n−1), so that it is expected that the predicted value y(n) recalculated by replacing the observed value as the input value in the one prediction by the predicted value y(n−1) be also a sufficiently approximate value. In a subsequent prediction, y(n) is used as the input value instead of u(n). Repeating this process enables performing the prediction not only once but multiple times.

Although this embodiment sets the sampling frequency of the A/D converter 51 that A/D-converts the angular velocity detection signal from the gyro sensor 26 equal to the sampling frequency of the image sensor 11 used for acquiring the motion vector detection signal as described above, the sampling frequency of the A/D converter 51 may be set to other frequencies.

Sampling frequencies of typical image sensors are lower than that of other sensors such as a gyro sensor. For example, the sampling frequencies of the other sensors are settable from 1 kHz to 50 kHz relative to the sampling frequency of the image sensor 11 from 30 Hz to 240 Hz. Thus, this embodiment matches the sampling frequency of the A/D converter 51 used for acquiring the shake detection signal with the sampling frequency of the image sensor 11 used for acquiring the motion vector detection signal. However, as long as sampling rates at the subtractor 57a provided anterior to the predictor 56 are matched with each other, the sampling frequency of the A/D converter 51 may be set to a higher frequency.

For example, a down-sampler that converts a sampling frequency for the output from the integrator 52 to a lower frequency may be provided anterior to the subtractor 57a. This down-sampler down-samples, at the sampling frequency of the image sensor 11, the angular velocity detection signal sampled by the A/D converter 51 at a higher sampling frequency. In addition, an up-sampler that converts the sampling frequency to a higher frequency is inserted posterior to the predictor 56. This up-sampler up-samples, at the original sampling frequency of the A/D converter 51, the shake correction signal from the predictor 56.

Furthermore, although this embodiment described the case of subtracting the predicted error signal from the gyro shake detection signal during the still image exposure, a predicted error signal weighted depending on an elapsed time from start of the still image exposure may be subtracted from the gyro shake detection signal. For example, as a time period of the still image exposure increases, the prediction accuracy of the predicted error signal decreases. Therefore, the shake detection signal may be calculated by subtracting, from the gyro shake detection signal, a result value of multiplying the predicted error signal by a time-dependent weighting coefficient that makes the result value smaller as the elapsed time from the start of the still image exposure increases. Moreover, when the time period of the still image exposure exceeds a predetermined time period, a process in which the subtraction of the predicted error signal is omitted may be performed.

The motion vector detector 14 detects the motion of the object image on the image sensor 11 and therefore is capable of also detecting a shift shake of the camera 1; the shift shake is a shake parallel to an image-capturing surface of the image sensor 11. The shift shake is more likely to influence image capturing in which an object distance is short and an image magnification is large. On the other hand, the gyro sensor 26 is an angular velocity sensor and therefore cannot detect the shift shake. That is, during the still image exposure, the gyro sensor 26 only enables detecting an angular shake.

However, subtracting the motion vector detection signal from the gyro shake detection signal provides a difference signal as a result of subtracting a signal (shift shake signal) corresponding to the shift shake from the error component of the gyro shake detection signal as an angular shake signal from the gyro sensor 26. Calculating the predicted error signal for during the still image exposure using this difference signal and subtracting this predicted error signal from the angular shake signal during the still image exposure results in subtracting the predicted error signal from the angular shake signal acquired from the gyro sensor 26 and in adding the shift shake signal to the angular shake signal. That is, during the still image exposure, though only the angular shake signal is acquirable through the gyro sensor 26, the image stabilization control is performed by calculating the shake correction signal that takes into account an influence of the shift shake. Thus, this embodiment is effective for image capturing in which the image magnification is large and therefore the influence of the shift shake is significant.

Figure 8:
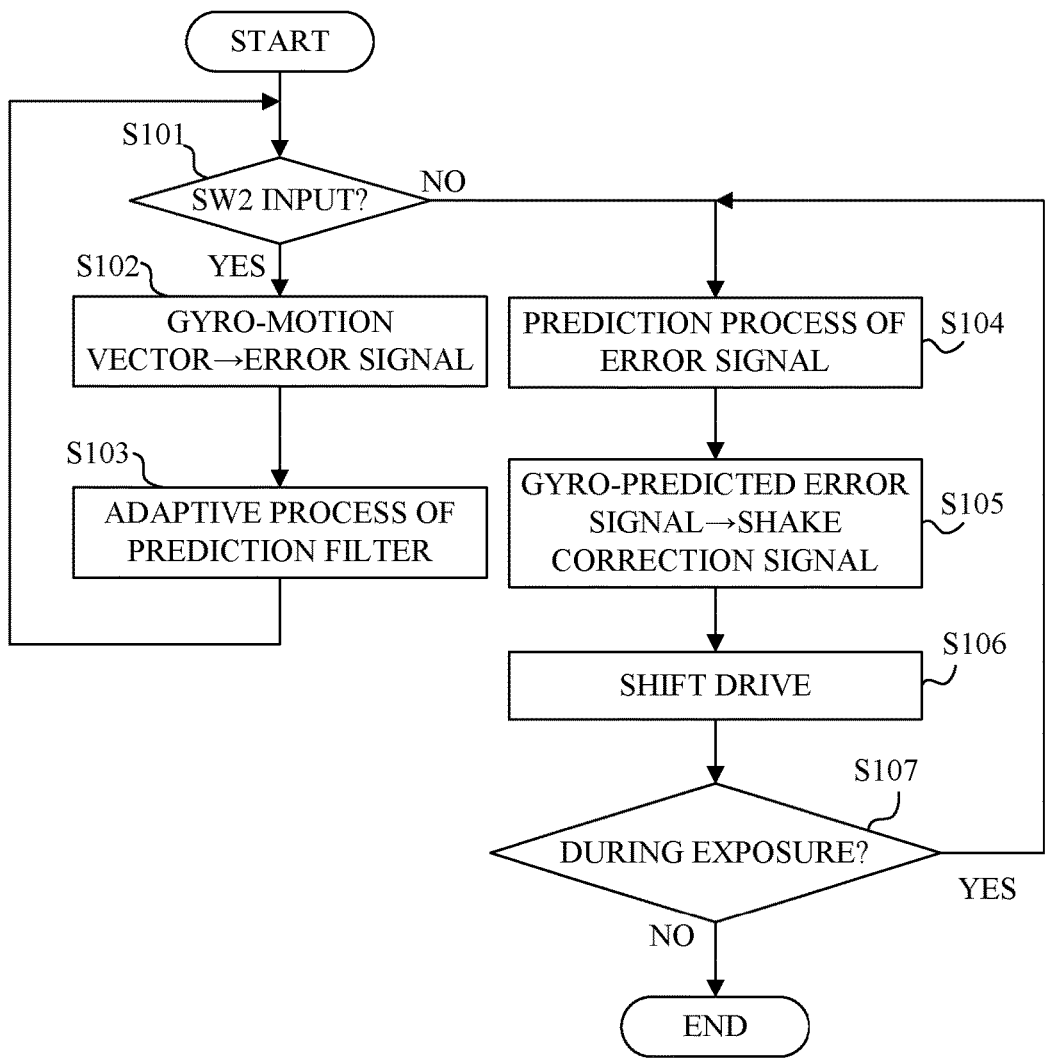
FIG. 8 is a flowchart of an image stabilization control program for executing a process in Embodiment 1.

The image stabilization controller 30 constituted by a computer may perform the above-described process according to an image stabilization control program as a computer program. FIG. 8 illustrates a flowchart of the process performed by the image stabilization controller 30 according to the image stabilization control program.

At step 101, the image stabilization controller 30 determines whether or not a second release signal SW2 notification from the camera controller 10 has been made; the second release signal SW2 notification is made for notifying the lens controller 25 that the second release signal second release signal second release signal SW2 has been input to the camera controller 10. If the second release signal SW2 notification has not been made, the image stabilization controller 30 proceeds to step S102. If the second release signal SW2 notification has been made (that is, it is during the still image exposure), the image stabilization controller 30 proceeds to step S104.

At step S102, the image stabilization controller 30 acquires the motion vector detection signal from the motion vector detector 14, and integrates the angular velocity detection signal from the gyro sensor 26 to acquire the gyro shake detection signal. Then, the image stabilization controller 30 subtracts the motion vector detection signal from the gyro shake detection signal to calculate the error signal.

Next, at step S103, the image stabilization controller 30 performs, using the error signal, the above-described adaptive process of the prediction filter.

Thereafter, the image stabilization controller 30 returns to step S101 to again determine whether or not the second release signal SW2 notification has been made. If the second release signal SW2 notification has not been made, the image stabilization controller 30 repeats the processes at steps S102 and S103.

On the other hand, at step S104, the image stabilization controller 30 performs the prediction process for calculating the predicted error signal using the prediction filter having been subjected to the adaptive process, and at step S105 subtracts the predicted error signal from the gyro shake detection signal to produce the shake correction signal.

Next, at step S106, the image stabilization controller 30 drives the shift lens (24) using the shake correction signal, that is, performs the image stabilization control.

Finally, at step S107, the image stabilization controller 30 determines whether or not it is during the still image exposure. If it is during the still image exposure, the image stabilization controller 30 returns to step S104 to repeat the processes at steps 104 to S106. If the still image exposure has been completed, the image stabilization controller 30 ends this process.

[Embodiment 2]

Figure 6:
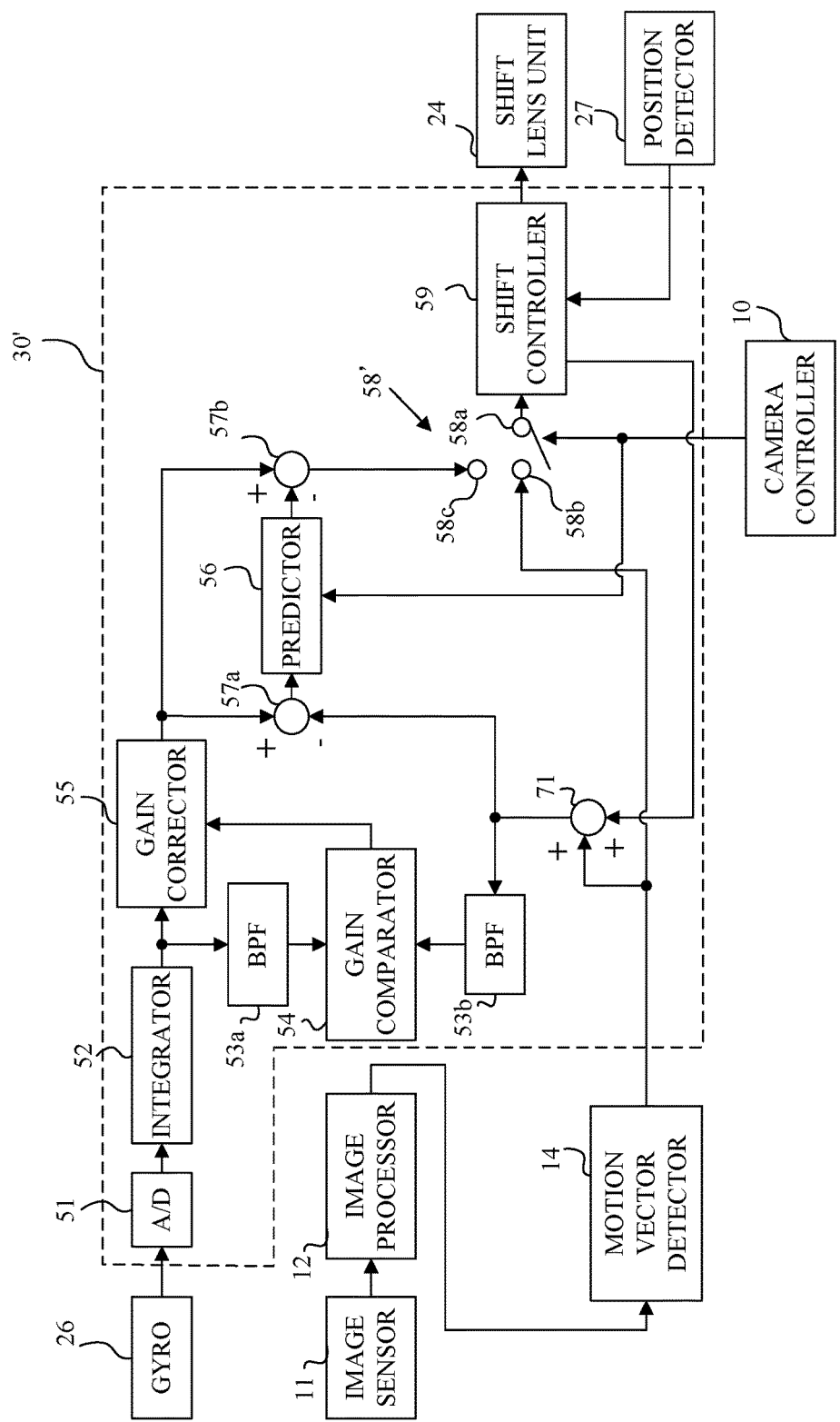
FIG. 6 is a block diagram illustrating a configuration of an image stabilization apparatus of Embodiment 2.

With reference to FIG. 6, description will be made of a digital camera including an image stabilization apparatus (image stabilization controller 30') that is a second embodiment (Embodiment 2) of the present invention. Although Embodiment 1 described the case of starting the image stabilization control in response to the second release signal SW2 that instructs the still image exposure, Embodiment 2 performs the image stabilization control so as to enable displaying on the image display unit 16 a live-view image in which image blur is reduced before the still image exposure. Specifically, the image stabilization controller 30' starts the image stabilization control in response to output of the first release signal SW1 that instructs the image capturing preparation operation from the operation unit 15. Until the second release signal SW2 is output from the operation unit 15, the image stabilization controller 30' performs the image stabilization control using a shake correction signal that is the motion vector detection signal instead of using the shake correction signal described in Embodiment 1. Thereafter, in response to output of the second release signal SW2 from the operation unit 15, the image stabilization controller 30' performs, as well as in Embodiment 1, the image stabilization control using the shake correction signal produced by subtracting the predicted error signal from the gyro shake detection signal.

Since the digital camera of this embodiment has the same configuration as that of the digital camera 1 described in Embodiment 1 and illustrated in FIG. 2, description thereof is omitted. In FIG. 6, constituent elements of the image stabilization controller 30' common to those of the image stabilization controller 30 described in Embodiment 1 and illustrated in FIG. 1 are denoted by the same reference numerals as those in Embodiment 1, and description thereof is omitted.

In FIG. 6, the image stabilization controller 30' includes an adder 71, and an output selecting switch 58'. The adder 71 adds the motion vector detection signal from the motion vector detector 14 to a shift drive amount (control amount) provided from the shift controller 59 to the shift lens (24), and outputs a signal resulted from this addition to the BPF 53b and the subtractor 57a. The output selecting switch 58' is provided for switching between a first on state where the terminal 58a connected to the shift controller 59 is connected to a first terminal 58b to which the motion vector detection signal from the motion vector detector 14 is supplied and a second on state where the terminal 58a is connected to a second terminal 58c to which the shake correction signal from the subtractor 57b is supplied. The output selecting switch 58' is switched in response to a command from the camera controller 10 illustrated in FIG. 2.

Before the first release signal SW1 is output, the output selecting switch 58' is set off in which the terminal 58a is not connected to either of the first and second terminals 58b and 58c. In this off state, the shift lens (24) is not driven, that is, the image stabilization control is not performed.

When the first release signal SW1 is output (that is, when the image-capturing preparation time period is started), the output selecting switch 58' is set to the first on state in which the terminal 58a is connected to the first terminal 58b. In the first on state, the motion vector detection signal from the motion vector detector 14 is input as the shake correction signal (second image stabilization signal) to the shift controller 59, and thereby the image stabilization control using the motion vector detection signal as the shake correction signal is performed.

The motion vector detection signal detected during this image stabilization control using the motion vector detection signal as the shake correction signal corresponds to an image blur on the image sensor that cannot be removed by the drive of the shift lens (24); the image blur that cannot be removed is hereinafter referred to as "a residual image blur". That is, adding the shift drive amount of the shift lens (24) to the motion vector corresponds to the residual image blur provides a motion vector corresponding to an actual camera shake amount. Therefore, this embodiment adds a signal (hereinafter referred to as "a shift dive amount signal") indicating the shift drive amount of the shift lens (24) by the shift controller 59 to the motion vector detection signal corresponds to the residual image blur, and subtracts a result of this addition from the gyro shake detection signal to acquire the error signal. The predictor 56 performs the prediction process using this error signal.

Specifically, the shift controller 59 outputs the signal indicating the shift drive amount of the shift lens (24) to the adder 71. The adder 71 adds this shift drive amount signal to the motion vector detection signal output from the motion vector detector 14 and corresponding to the residual image blur. The gain comparator 54 compares a gain of the motion vector detection signal (including the shift drive amount signal) output from the adder 71 and further passing through the BPF 53b with that of the gyro shake detection signal output from the integrator 52 and further passing through the BPF 53a. The gain corrector 55 corrects the gain of the gyro shake detection signal output from the integrator 52 depending on a gain comparison result from the gain comparator 54. The subtractor 57a subtracts the motion vector detection signal (including the shift drive amount signal) output from the adder 71 from the gyro shake detection signal output from the gain corrector 55, and sends the error signal as a result of the subtraction to the predictor 56. The predictor 56 performs, until the still image exposure is started in response to the second release signal SW2, the adaptive process using the error signal from the subtractor 57a for updating the prediction filter.

When the second release signal SW2 is output (that is, when the still image exposure is started), the output selecting switch 58' is set to the second on state in which the terminal 58a is connected to the second terminal 58c. The predictor 56 outputs the predicted error signal calculated by using the prediction filter, which has been subjected to the adaptive process before the start of the still image exposure, to the subtractor 57b. The subtractor 57b subtracts the predicted error signal produced by the predictor 56 from the gyro shake detection signal output from the gain corrector 55 to produce the shake correction signal, and inputs this shake correction signal to the shift controller 59 through the output selecting switch 58'. In this way, as well as in Embodiment 1, the image stabilization control using the shake correction signal in which the influence of the error signal included in the gyro shake detection signal is reduced is performed.

After completion of the still image exposure, the process of the predictor 56 and the switching state of the output selecting switch 58' are returned to the states before the first release signal SW1 is output.

As described above, this embodiment performs the image stabilization control using the motion vector detection signal from the image-capturing preparation time period before the still image exposure, and therefore allows a user to perform framing while allowing the user to view a live-view image in which image blur is sufficiently reduced. Furthermore, this embodiment enables performing, as well as in Embodiment 1, a good image stabilization control in which the influence of the error component generated in the gyro sensor 26 is reduced.

Although in this embodiment, during the image-capturing preparation time period the gain comparator 54 compares the gain of the signal acquired by adding the motion vector detection signal corresponding to the residual image blur detected by the motion vector detector 14 to the shift drive amount signal from the shift controller 59 with that of the gyro shake detection signal. However, another method may be employed that also uses during the image-capturing preparation time period, the gain comparison result acquired before the image-capturing preparation time period.

[Embodiment 3]

Next, with reference to FIG. 7, description will be made of a digital camera including an image stabilization apparatus (image stabilization controller 30") that is a third embodiment (Embodiment 3) of the present invention. This embodiment performs the image stabilization control during the image-capturing preparation time period as well as in Embodiment 2, and however, this embodiment performs the image stabilization control using the gyro shake detection signal, which is different from Embodiment 2.

Since the digital camera of this embodiment has the same configuration as that of the digital camera 1 described in Embodiment 1 and illustrated in FIG. 2, description thereof is omitted. In FIG. 7, constituent elements of the image stabilization controller 30" common to those of the image stabilization controllers 30 and 30' described in Embodiments 1 and 2 and illustrated in FIGS. 1 and 6 are denoted by the same reference numerals as those in Embodiments 1 and 2, and description thereof is omitted.

Figure 7:
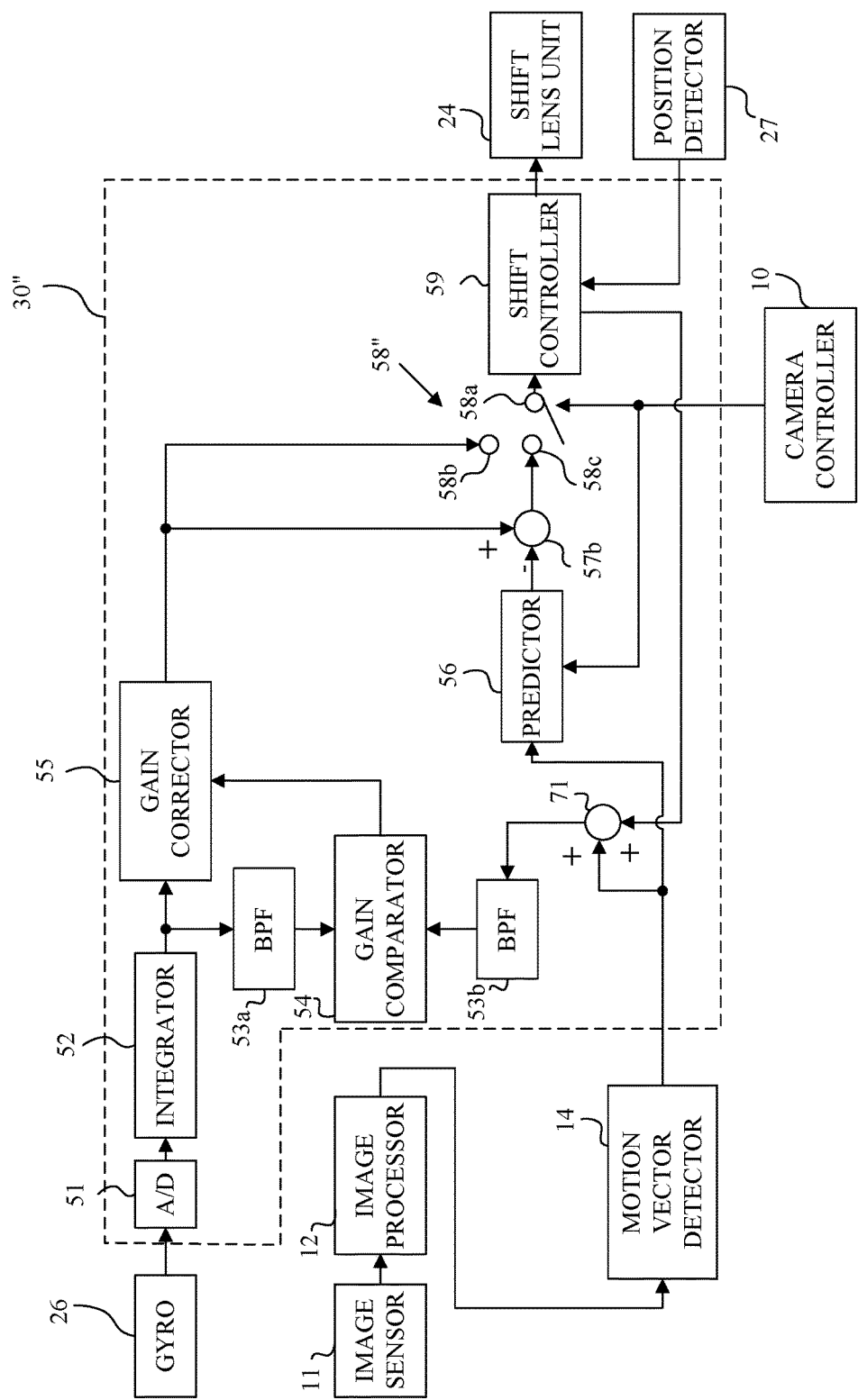
FIG. 7 is a block diagram illustrating a configuration of an image stabilization apparatus of Embodiment 3 of the present invention.

In FIG. 7, the image stabilization controller 30" includes an output selecting switch 58". The output selecting switch 58" is provided for switching between a first on state where the terminal 58a connected to the shift controller 59 is connected to a first terminal 58b to which the gyro shake detection signal from the gain corrector 55 is supplied and a second on state where the terminal 58a is connected to a second terminal 58c to which the shake correction signal from the subtractor 57b is supplied. The output selecting switch 58" is switched in response to a command from the camera controller 10 illustrated in FIG. 2.

Before the first release signal SW1 is output, the output selecting switch 58" is set off in which the terminal 58a is not connected to either of the first and second terminals 58b and 58c. In this off state, the shift lens (24) is not driven, that is, the image stabilization control is not performed.

When the first release signal SW1 is output (that is, when the image-capturing preparation time period is started), the output selecting switch 58" is set to the first on state in which the terminal 58a is connected to the first terminal 58b. In the first on state, the gyro shake detection signal from the gain corrector 55 is input as the shake correction signal (third image stabilization signal) to the shift controller 59, and thereby the image stabilization control using the gyro shake detection signal is performed. The motion vector detection signal detected by the motion vector detector 14 during the image stabilization control performed using the gyro shake detection signal corresponds to the error signal included in the gyro shake detection signal. Thus, the predictor 56 performs the adaptive process of the prediction filter using the motion vector detection signal detected by the motion vector detector 14 during this image stabilization control.

When the second release signal SW2 is output (that is, when the still image exposure is started), the output selecting switch 58" is set to the second on state in which the terminal 58a is connected to the second terminal 58c. The predictor 56 outputs the predicted error signal calculated by using the prediction filter, which has been subjected to the adaptive process before the start of the still image exposure, to the subtractor 57b. The subtractor 57b subtracts the predicted error signal produced by the predictor 56 from the gyro shake detection signal output from the gain corrector 55 to produce the shake correction signal, and inputs this shake correction signal to the shift controller 59 through the output selecting switch 58". In this way, as well as in Embodiment 1, the image stabilization control using the shake correction signal in which the influence of the error signal included in the gyro shake detection signal is reduced is performed.

After completion of the still image exposure, the process of the predictor 56 and the switching state of the output selecting switch 58" are returned to the states before the first release signal SW1 is output.

As described above, this embodiment performs the image stabilization control using the gyro shake detection signal from the image-capturing preparation time period before the still image exposure, and therefore allows a user to perform framing while allowing the user to view a live-view image in which image blur is sufficiently reduced. Furthermore, this embodiment enables performing, as well as in Embodiment 1, a good image stabilization control in which the influence of the error component generated in the gyro sensor 26 is reduced.

Each of the above-described embodiments enables performing, by using the motion vector detection signal, a good image stabilization control in which the influence of the error signal included in the shake detection signal is reduced.

[Other Embodiments]

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-106319, filed on May 27, 2016, which is hereby incorporated by reference herein in its entirety.

What is claimed is:

1. An image stabilization control apparatus configured to perform, using (a) a shake detection signal acquired through a shake detector configured to detect a shake and (b) a motion vector detection signal indicating a motion vector based on an image signal produced through an image sensor, image stabilization control for reducing image blur due to the shake, the apparatus comprising:
a predictor configured to produce, using the motion vector detection signal, a predicted error signal that indicates a predicted value of an error signal included in the shake detection signal;
a signal producer configured to subtract the predicted error signal from the shake detection signal to produce a first image stabilization signal; and
a controller configured to perform the image stabilization control using the first image stabilization signal,
wherein the predictor is configured to produce the predicted error signal using difference between the shake detection signal and the motion vector detection signal.

2. An image stabilization control apparatus according to claim 1, wherein:
the controller is configured to be capable of performing the image stabilization control using the motion vector detection signal as a second image stabilization signal instead of using the first image stabilization signal; and
the predictor is configured to produce the predicted error signal using difference between (a) a result of adding a control amount in the image stabilization control performed using the second image stabilization signal to the motion vector detection signal detected during that image stabilization control and (b) the shake detection signal.

3. An image stabilization control apparatus according to claim 1, wherein:
the controller is configured to be capable of performing the image stabilization control using the shake detection signal as a third image stabilization signal instead of using the first image stabilization signal; and
the predictor is configured to produce the predicted error signal using the motion vector detection signal detected during the image stabilization control performed using the third image stabilization signal.

4. An image stabilization control apparatus according to claim 1, wherein the controller is configured to perform the image stabilization control using the first image stabilization signal during still image capturing.

5. An image stabilization control apparatus according to claim 1, wherein the predictor is configured to:
produce the predicted error signal using a prediction filter; and
before producing the predicted error signal, perform an adaptive process for updating the prediction filter by using the motion vector detection signal.

6. An image stabilization control apparatus according to claim 1, wherein the controller is configured to decrease a weight for the predicted error signal that is subtracted from the shake detection signal with elapse of an exposure time of the image sensor.

7. An image stabilization control apparatus according to claim 1, wherein a sampling frequency for acquiring the shake detection signal is set equal to a sampling frequency for acquiring the motion vector detection signal.

8. An image stabilization control apparatus according to claim 1, further comprising a gain adjuster configured to control a gain for the shake detection signal depending on a result of comparison between the shake detection signal and the motion vector detection signal.

9. An optical apparatus comprising:
an apparatus body; and
an image stabilization control apparatus configured to perform, using (a) a shake detection signal acquired through a shake detector configured to detect a shake and (b) a motion vector detection signal indicating a motion vector based on an image signal produced through an image sensor, image stabilization control for reducing image blur due to the shake,
wherein the image stabilization control apparatus comprises:
a predictor configured to produce, using the motion vector detection signal, a predicted error signal that indicates a predicted value of an error signal included in the shake detection signal;
a signal producer configured to subtract the predicted error signal from the shake detection signal to produce a first image stabilization signal; and
a controller configured to perform the image stabilization control using the first image stabilization signal,
wherein the predictor is configured to produce the predicted error signal using difference between the shake detection signal and the motion vector detection signal.

10. An image stabilization control apparatus configured to perform, using (a) a shake detection signal acquired through a shake detector configured to detect a shake and (b) a motion vector detection signal indicating a motion vector based on an image signal produced through an image sensor, image stabilization control for reducing image blur due to the shake, the apparatus comprising:

a predictor configured to produce, using the motion vector detection signal, a predicted error signal that indicates a predicted value of an error signal included in the shake detection signal;

a signal producer configured to subtract the predicted error signal from the shake detection signal to produce a first image stabilization signal; and a controller configured to perform the image stabilization control using the first image stabilization signal, wherein the controller is configured to be capable of performing the image stabilization control using the motion vector detection signal as a second image stabilization signal instead of using the first image stabilization signal, and wherein the predictor is configured to produce the predicted error signal using difference between (a) a result of adding a control amount in the image stabilization control performed using the second image stabilization signal to the motion vector detection signal detected during that image stabilization control and (b) the shake detection signal.

11. An optical apparatus comprising:

an apparatus body; and an image stabilization control apparatus configured to perform, using (a) a shake detection signal acquired through a shake detector configured to detect a shake and (b) a motion vector detection signal indicating a motion vector based on an image signal produced through an image sensor, image stabilization control for reducing image blur due to the shake, wherein the image stabilization control apparatus comprises:

a predictor configured to produce, using the motion vector detection signal, a predicted error signal that indicates a predicted value of an error signal included in the shake detection signal;

a signal producer configured to subtract the predicted error signal from the shake detection signal to produce a first image stabilization signal; and a controller configured to perform the image stabilization control using the first image stabilization signal, wherein the controller is configured to be capable of performing the image stabilization control using the motion vector detection signal as a second image stabilization signal instead of using the first image stabilization signal, and wherein the predictor is configured to produce the predicted error signal using difference between (a) a result of adding a control amount in the image stabilization control performed using the second image stabilization signal to the motion vector detection signal detected during that image stabilization control and (b) the shake detection signal.

12. An image stabilization control apparatus configured to perform, using (a) a shake detection signal acquired through a shake detector configured to detect a shake and (b) a motion vector detection signal indicating a motion vector based on an image signal produced through an image sensor, image stabilization control for reducing image blur due to the shake, the apparatus comprising:

a predictor configured to produce, using the motion vector detection signal, a predicted error signal that indicates a predicted value of an error signal included in the shake detection signal;

a signal producer configured to subtract the predicted error signal from the shake detection signal to produce a first image stabilization signal; and a controller configured to perform the image stabilization control using the first image stabilization signal, wherein the controller is configured to be capable of performing the image stabilization control using the shake detection signal as a third image stabilization signal instead of using the first image stabilization signal, and wherein the predictor is configured to produce the predicted error signal using the motion vector detection signal detected during the image stabilization control performed using the third image stabilization signal.

13. An optical apparatus comprising:

an apparatus body; and an image stabilization control apparatus configured to perform, using (a) a shake detection signal acquired through a shake detector configured to detect a shake and (b) a motion vector detection signal indicating a motion vector based on an image signal produced through an image sensor, image stabilization control for reducing image blur due to the shake, wherein the image stabilization control apparatus comprises:

a predictor configured to produce, using the motion vector detection signal, a predicted error signal that indicates a predicted value of an error signal included in the shake detection signal;

a signal producer configured to subtract the predicted error signal from the shake detection signal to produce a first image stabilization signal; and a controller configured to perform the image stabilization control using the first image stabilization signal, wherein the controller is configured to be capable of performing the image stabilization control using the shake detection signal as a third image stabilization signal instead of using the first image stabilization signal, and wherein the predictor is configured to produce the predicted error signal using the motion vector detection signal detected during the image stabilization control performed using the third image stabilization signal.

14. An image stabilization control apparatus configured to perform, using (a) a shake detection signal acquired through a shake detector configured to detect a shake and (b) a motion vector detection signal indicating a motion vector based on an image signal produced through an image sensor, image stabilization control for reducing image blur due to the shake, the apparatus comprising:

a predictor configured to produce, using the motion vector detection signal, a predicted error signal that indicates a predicted value of an error signal included in the shake detection signal;

a signal producer configured to subtract the predicted error signal from the shake detection signal to produce a first image stabilization signal; and a controller configured to perform the image stabilization control using the first image stabilization signal, wherein the predictor is configured to:

produce the predicted error signal using a prediction filter, and before producing the predicted error signal, perform an adaptive process for updating the prediction filter by using the motion vector detection signal.

15. An optical apparatus comprising:

an apparatus body; and an image stabilization control apparatus configured to perform, using (a) a shake detection signal acquired through a shake detector configured to detect a shake and (b) a motion vector detection signal indicating a motion vector based on an image signal produced through an image sensor, image stabilization control for reducing image blur due to the shake, wherein the image stabilization control apparatus comprises:
- a predictor configured to produce, using the motion vector detection signal, a predicted error signal that indicates a predicted value of an error signal included in the shake detection signal;
- a signal producer configured to subtract the predicted error signal from the shake detection signal to produce a first image stabilization signal; and
- a controller configured to perform the image stabilization control using the first image stabilization signal,
- wherein the predictor is configured to:
  - produce the predicted error signal using a prediction filter, and
  - before producing the predicted error signal, perform an adaptive process for updating the prediction filter by using the motion vector detection signal.

16. An image stabilization control apparatus configured to perform, using (a) a shake detection signal acquired through a shake detector configured to detect a shake and (b) a motion vector detection signal indicating a motion vector based on an image signal produced through an image sensor, image stabilization control for reducing image blur due to the shake, the apparatus comprising:
- a predictor configured to produce, using the motion vector detection signal, a predicted error signal that indicates a predicted value of an error signal included in the shake detection signal;
- a signal producer configured to subtract the predicted error signal from the shake detection signal to produce a first image stabilization signal; and
- a controller configured to perform the image stabilization control using the first image stabilization signal,
- wherein the controller is configured to decrease a weight for the predicted error signal that is subtracted from the shake detection signal with elapse of an exposure time of the image sensor.

17. An optical apparatus comprising:
an apparatus body; and
an image stabilization control apparatus configured to perform, using (a) a shake detection signal acquired through a shake detector configured to detect a shake and (b) a motion vector detection signal indicating a motion vector based on an image signal produced through an image sensor, image stabilization control for reducing image blur due to the shake,
wherein the image stabilization control apparatus comprises:
- a predictor configured to produce, using the motion vector detection signal, a predicted error signal that indicates a predicted value of an error signal included in the shake detection signal;
- a signal producer configured to subtract the predicted error signal from the shake detection signal to produce a first image stabilization signal; and
- a controller configured to perform the image stabilization control using the first image stabilization signal,
- wherein the controller is configured to decrease a weight for the predicted error signal that is subtracted from the shake detection signal with elapse of an exposure time of the image sensor.

18. An image stabilization control apparatus configured to perform, using (a) a shake detection signal acquired through a shake detector configured to detect a shake and (b) a motion vector detection signal indicating a motion vector based on an image signal produced through an image sensor, image stabilization control for reducing image blur due to the shake, the apparatus comprising:
- a predictor configured to produce, using the motion vector detection signal, a predicted error signal that indicates a predicted value of an error signal included in the shake detection signal;
- a signal producer configured to subtract the predicted error signal from the shake detection signal to produce a first image stabilization signal; and
- a controller configured to perform the image stabilization control using the first image stabilization signal,
- wherein a sampling frequency for acquiring the shake detection signal is set equal to a sampling frequency for acquiring the motion vector detection signal.

19. An optical apparatus comprising:
an apparatus body; and
an image stabilization control apparatus configured to perform, using (a) a shake detection signal acquired through a shake detector configured to detect a shake and (b) a motion vector detection signal indicating a motion vector based on an image signal produced through an image sensor, image stabilization control for reducing image blur due to the shake,
wherein the image stabilization control apparatus comprises:
- a predictor configured to produce, using the motion vector detection signal, a predicted error signal that indicates a predicted value of an error signal included in the shake detection signal;
- a signal producer configured to subtract the predicted error signal from the shake detection signal to produce a first image stabilization signal; and
- a controller configured to perform the image stabilization control using the first image stabilization signal,
- wherein a sampling frequency for acquiring the shake detection signal is set equal to a sampling frequency for acquiring the motion vector detection signal.

20. An image stabilization control apparatus configured to perform, using (a) a shake detection signal acquired through a shake detector configured to detect a shake and (b) a motion vector detection signal indicating a motion vector based on an image signal produced through an image sensor, image stabilization control for reducing image blur due to the shake, the apparatus comprising:
- a predictor configured to produce, using the motion vector detection signal, a predicted error signal that indicates a predicted value of an error signal included in the shake detection signal;
- a signal producer configured to subtract the predicted error signal from the shake detection signal to produce a first image stabilization signal;
- a controller configured to perform the image stabilization control using the first image stabilization signal; and
- a gain adjuster configured to control a gain for the shake detection signal depending on a result of comparison between the shake detection signal and the motion vector detection signal.

21. An optical apparatus comprising:
an apparatus body; and
an image stabilization control apparatus configured to perform, using (a) a shake detection signal acquired through a shake detector configured to detect a shake and (b) a motion vector detection signal indicating a motion vector based on an image signal produced through an image sensor, image stabilization control for reducing image blur due to the shake, wherein the image stabilization control apparatus comprises:

a predictor configured to produce, using the motion vector detection signal, a predicted error signal that indicates a predicted value of an error signal included in the shake detection signal;

a signal producer configured to subtract the predicted error signal from the shake detection signal to produce a first image stabilization signal;

a controller configured to perform the image stabilization control using the first image stabilization signal; and a gain adjuster configured to control a gain for the shake detection signal depending on a result of comparison between the shake detection signal and the motion vector detection signal.

* * * * *